(12) United States Patent
Tawari et al.

(10) Patent No.: US 11,420,623 B2
(45) Date of Patent: Aug. 23, 2022

(54) SYSTEMS FOR DETERMINING OBJECT IMPORTANCE IN ON-ROAD DRIVING SCENARIOS AND METHODS THEREOF

(71) Applicant: HONDA MOTOR CO., LTD., Tokyo (JP)

(72) Inventors: Ashish Tawari, Santa Clara, CA (US); Sujitha Catherine Martin, Sunnyvale, CA (US); Mingfei Gao, Greenbelt, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/359,731

(22) Filed: Mar. 20, 2019

(65) Prior Publication Data

US 2020/0298847 A1 Sep. 24, 2020

(51) Int. Cl.
*B60W 30/095* (2012.01)
*G06V 20/58* (2022.01)

(52) U.S. Cl.
CPC .... *B60W 30/0953* (2013.01); *B60W 30/0956* (2013.01); *G06V 20/58* (2022.01)

(58) Field of Classification Search
None
See application file for complete search history.

(56) References Cited

U.S. PATENT DOCUMENTS

| | | | | |
|---|---|---|---|---|
| 5,699,040 A * | 12/1997 | Matsuda | | B60Q 9/008 340/435 |
| 7,202,776 B2 * | 4/2007 | Breed | | G01S 19/42 340/435 |
| 7,979,172 B2 * | 7/2011 | Breed | | G08G 1/161 701/23 |
| 8,126,642 B2 * | 2/2012 | Trepagnier | | G01S 17/86 701/423 |
| 8,676,431 B1 * | 3/2014 | Mariet | | G05D 1/0246 701/28 |
| 10,565,714 B2 * | 2/2020 | Hunt | | G06K 9/4671 |
| 2005/0278088 A1 * | 12/2005 | Thorner | | B60W 40/02 701/28 |
| 2011/0169625 A1 * | 7/2011 | James | | G08G 1/166 340/439 |
| 2012/0140061 A1 * | 6/2012 | Zeng | | G01S 13/867 348/135 |

(Continued)

OTHER PUBLICATIONS

Mukhtar, Amir & Xia, Likun & Tang, Tong Boon. (2015). Vehicle Detection Techniques for Collision Avoidance Systems: A Review. IEEE Transactions on Intelligent Transportation Systems. 16. 1-21. 10.1109/TITS.2015.2409109. (Year: 2015).*

(Continued)

*Primary Examiner* — James J Lee
*Assistant Examiner* — Wenyuan Yang
(74) *Attorney, Agent, or Firm* — ArentFox Schiff LLP

(57) ABSTRACT

Determining object importance in vehicle control systems can include obtaining, for a vehicle in operation, an image of a dynamic scene, identifying an object type associated with one or more objects in the image, determining, based on the object type and a goal associated with the vehicle, an importance metric associated with the one or more objects, and controlling the vehicle based at least in part on the importance metric associated with the one or more objects.

20 Claims, 7 Drawing Sheets

(56) References Cited

U.S. PATENT DOCUMENTS

| | | | | |
|---|---|---|---|---|
| 2014/0032017 | A1* | 1/2014 | Anderson | G05D 1/00 701/3 |
| 2014/0229069 | A1* | 8/2014 | Akiyama | B60W 10/18 701/41 |
| 2016/0180531 | A1* | 6/2016 | Lessmann | G06T 7/246 382/103 |
| 2017/0083752 | A1* | 3/2017 | Saberian | G06N 3/0454 |
| 2018/0182247 | A1* | 6/2018 | Baba | B60W 30/09 |
| 2018/0246517 | A1* | 8/2018 | Costa | B60W 30/0953 |
| 2019/0047552 | A1* | 2/2019 | Hattori | B60W 30/085 |
| 2019/0220030 | A1* | 7/2019 | Ohmura | G05D 1/0223 |
| 2019/0265712 | A1* | 8/2019 | Satzoda | B60W 40/09 |
| 2019/0329771 | A1* | 10/2019 | Wray | B60W 30/09 |

OTHER PUBLICATIONS

K. Palaniappan et al., "Efficient feature extraction and likelihood fusion for vehicle tracking in low frame rate airborne video," 2010 13th International Conference on Information Fusion, 2010, pp. 1-8, doi: 10.1109/ICIF.2010.5711891. (Year: 2010).*

Alletto, S., et al. "(eye) ve: a dataset for attention-based tasks with applications to autonomous and assisted driving." In Proceedings of the IEEE Conference on Computer Vision and Pattern Recognition Workshops, pp. 54-60, 2016.

Andriluka, S., et al., "People-tracking-by-detection and people-detection-by-tracking." In Computer Vision and Pattern Recognition, 2008. CVPR 2008. IEEE Conference on, pp. 1-8. IEEE, 2008.

Bewley, A., et al., "Simple online and realtime tracking." In Image Processing (ICIP), 2016 IEEE International Conference on, pp. 3464-3468. IEEE, 2016.

Dalal, N. et al., "Human detection using oriented histograms of flow and appearance." In European conference on computer vision, pp. 428-441. Springer, 2006.

Everingham, M., et al., "The PASCAL Visual Object Classes Challenge 2007 (VOC2007) Results." http://www.pascal-network.org/challenges/VOC/voc2007/workshop/index.html.

Everingham, M., et al., "The PASCAL Visual Object Classes Challenge 2012 (VOC2012) Results." http://www.pascal-network.org/challenges/VOC/voc2012/workshop/index.html.

Fridman, L., et al., "Driver gaze region estimation without use of eye movement." IEEE Intelligent Systems, 31(3):49-56, 2016.

Girshick, R., "Fast r-cnn." In Proceedings of the IEEE International Conference on Computer Vision, pp. 1440-1448, 2015.

Girshick, R., et al., "Rich feature hierarchies for accurate object detection and semantic segmentation." In Computer Vision and Pattern Recognition, 2014.

He, K., et al., "Deep residual learning for image recognition." arXiv preprint arXiv:1512.03385, 2015.

He, K., et al., "Mask r-cnn." In Computer Vision (ICCV), 2017 IEEE International Conference on, pp. 2980-2988. IEEE, 2017.

Hochreiter, S., et al., "Long short-term memory." Neural computation, 9(8):1735-1780, 1997.

Kim, J., et al., "Interpretable learning for self-driving cars by visualizing causal attention." In ICCV, pp. 2961-2969, 2017.

Palazzi, A., et al., "Predicting the driver's focus of attention: the dr(eye)ve project." IEEE Transactions on Pattern Analysis and Machine Intelligence, 2018.

Pugeault, N., et al., How much of driving is preattentive? IEEE Transactions on Vehicular Technology, 64(12):5424-5438, 2015.

Ren, S., et al., "Faster r-cnn: Towards real-time object detection with region proposal networks." In Advances in neural information processing systems, pp. 91-99, 2015.

Simon, L., et al., "Alerting the drivers about road signs with poor visual saliency." In Proc. 2009 IEEE Intelligent Vehicles Symposium, pp. 48-53, 2009.

Tawari, A., et al., "A computational framework for driver's visual attention using a fully convolutional architecture." In Intelligent Vehicles Symposium (IV), 2017 IEEE, pp. 887-894. IEEE, 2017.

Tran, D., et al., "Learning spatiotemporal features with 3d convolutional networks." In Proceedings of the IEEE international conference on computer vision, pp. 4489-4497, 2015.

Underwood, G., et al., "Decisions about objects in real-world scenes are influenced by visual saliency before and during their inspection." Vision research, 51(18):2031-2038, 2011.

Xia, Y., et al., "Training a network to attend like human drivers saves it from common but misleading loss functions." arXiv preprint arXiv:1711.06406, 2017.

* cited by examiner

SYSTEMS FOR DETERMINING OBJECT IMPORTANCE IN ON-ROAD DRIVING SCENARIOS AND METHODS THEREOF

TECHNICAL FIELD

Aspects of the present disclosure relate generally to controlling vehicles, and more particularly, to determining detected object importance in making vehicle control decisions.

BACKGROUND

In complicated driving contexts, human vision systems can aid in perceiving and interacting with traffic participants, which can be beneficial in autonomous driving scenarios. Driver attention has been studied in order to better understand human driving behavior and ultimately assist in controlling autonomous vehicles. Systems have been developed to predict driver attention at the pixel level by mimicking human gaze behavior. Human gaze, however, is not always directly related to the driving task (e.g., distractions such as billboards can cause non-driving related gazing), and human gaze is sequential, which can make it difficult to capture all important information at the same time. In addition, conventional systems for predicting driver attention only use driving videos or images as input, and extract features from the videos or images to identify objects or determine an importance of the objects, which can be associated with a determined human gaze on the objects. Such systems, however, can provide prediction in limited driving scenarios, and may not allow for effective driver attention prediction in all cases.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method for determining object importance in vehicle control systems is provided. The method includes obtaining, for a vehicle in operation, an image of a dynamic scene, identifying an object type associated with one or more objects in the image, determining, based on the object type and a goal associated with the vehicle, an importance metric associated with the one or more objects, and controlling the vehicle based at least in part on the importance metric associated with the one or more objects.

In another example, a computing device for determining object importance in vehicle control systems is provided, including a memory and at least one processor coupled to the memory. The at least one processor is configured to obtain, for a vehicle in operation, an image of a dynamic scene, identify an object type associated with one or more objects in the image, determine, based on the object type and a goal associated with the vehicle, an importance metric associated with the one or more objects, and control the vehicle based at least in part on the importance metric associated with the one or more objects.

In another example, a non-transitory computer-readable medium storing computer executable code for determining object importance in vehicle control systems is provided. The code includes code for obtaining, for a vehicle in operation, an image of a dynamic scene, identifying an object type associated with one or more objects in the image, determining, based on the object type and a goal associated with the vehicle, an importance metric associated with the one or more objects, and controlling the vehicle based at least in part on the importance metric associated with the one or more objects.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
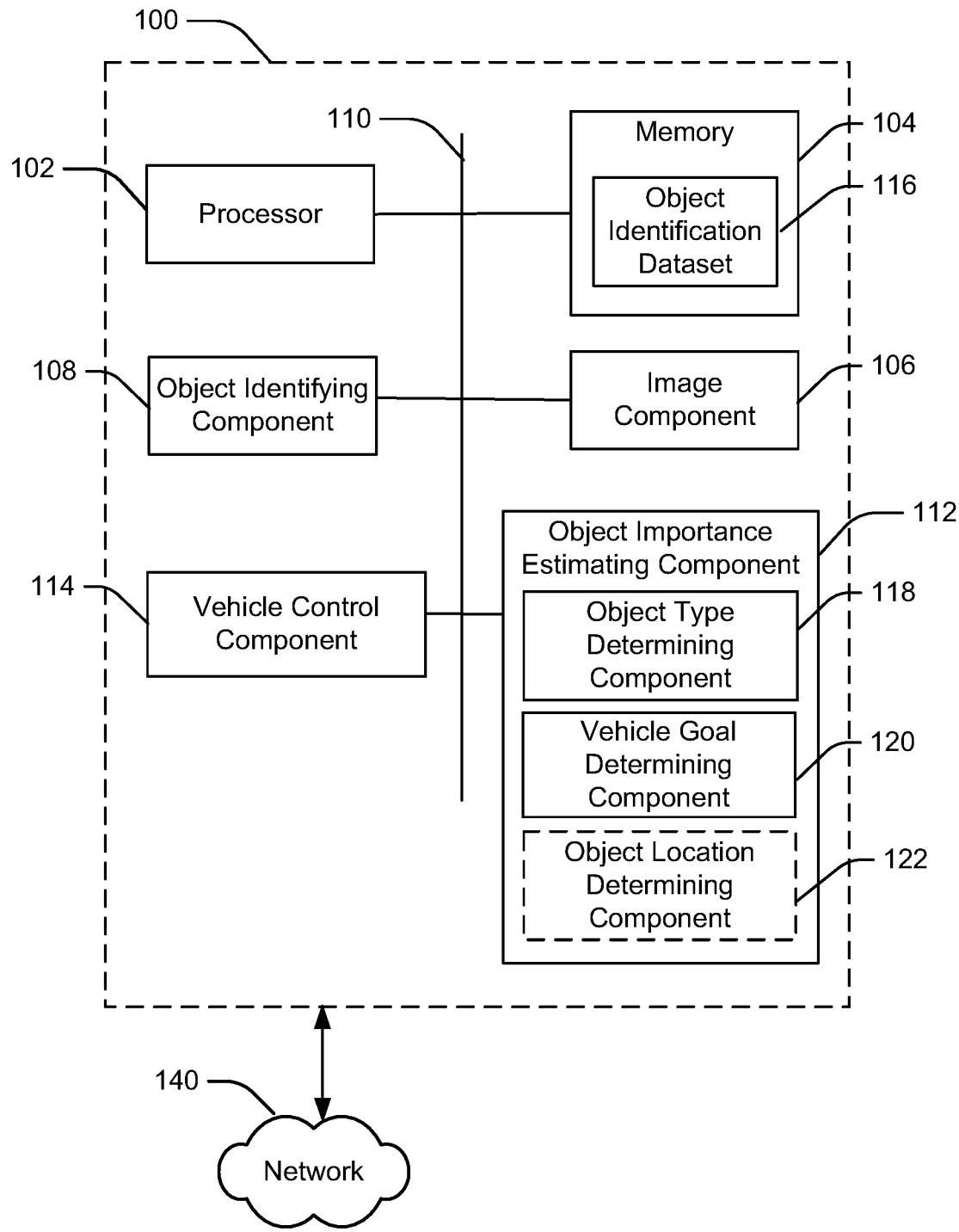
FIG. 1 illustrates a schematic view of an example of a system for determining object importance for controlling a vehicle according to one aspect of the disclosure.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known components are shown in block diagram form in order to avoid obscuring such concepts.

Described herein are aspects related to object importance determination in on-road driving scenarios. Objects can be identified from driving scenario video or image input using a visual model, and the importance of one or more of the objects can be determined using both the visual model and a goal model. Determination of object importance can also be referred to as Object Importance Estimating (OIE), and the identified objects and/or their corresponding importance can be used by a vehicle in making vehicle control decisions. In an example, the visual model can relate to identifying the objects (e.g., as road users, such as vehicles, persons, etc.), and can be based on comparing objects detected from an image to objects in a dataset in an attempt to identify a category or type associated with the object. Based on the category or type, for example, an object importance can be assigned to the object. Object importance, however, can also depend on a goal of the vehicle, and thus importance objects can be defined as road users, e.g., vehicles, persons, etc., that are relevant for the vehicle driver (e.g., an autonomous driver (AD) mechanism) to make the vehicle control decision. This definition can ensure that the important objects are directly related to the driving task and that multiple important objects can be captured at the same time. While visual dynamics of road users can be important for understanding the driving scene, a vehicle goal can also be helpful in determining object importance.

In addition, in this regard, the goal model can additionally be used to assign an importance to an identified object and/or to update an assigned importance of the identified object. For example, the goal can relate to a route of the vehicle. In this example, the importance of an identified object can be assigned or modified based on whether the identified object is in a path of the vehicle based on the route. Thus, for example, OIE for making vehicle control decisions can be based not only on identifying the object but also how the object relates to a goal of the vehicle. This can facilitate vehicle control decision-making for AD mechanisms that is more on par with human decision-making.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example of a system 100 for performing OIE for one or more objects in a dynamic scene in accordance with aspects described herein. Components of the system 100, as well as the components of other systems, hardware architectures and software architectures discussed herein, can be combined, omitted or organized into different architectures for various aspects of the disclosure. However, the example aspects and configurations discussed herein focus on the system 100 as illustrated in FIG. 1, with corresponding system components and related methods.

As shown in FIG. 1, system 100 can include or be operably coupled with (or executed by) one or more processors 102 and one or more memories 104 that communicate to effectuate certain actions described herein. For example, the one or more processors 102 and/or one or more memories 104 can execute, and/or store instructions, parameters, etc., for executing, an image component 106 for obtaining an image of a dynamic scene, an object identifying component 108 for identifying one or more objects and/or an associated object type in the image, an OIE component 112 for estimating an importance of the one or more objects, and/or a vehicle control component 114 for controlling the vehicle (e.g., one or more systems of the vehicle) based at least in part on the importance of the one or more objects. The processor(s) 102, memory(ies) 104, various ones of the components 106, 108, 112, 114, etc. can be operatively coupled via a bus 110. In another example, processor(s) 102 can execute one or more of the various components 106, 108, 112, 114 to perform functions described herein, while being operatively coupled to the memory(ies) 104 and/or other components via the bus 110.

In an example, image component 106 can capture an image and/or video of a dynamic scene during operation of a vehicle. Memory 104 can include an object identification dataset 116 to facilitate identifying one or more objects. In this example, object identifying component 108 can identify one or more objects or determine associated object types from the image. OIE component 112 can include an object type determining component 118 for determining the type of the one or more objects, and/or a vehicle goal determining component 120 for determining one or more goals associated with the vehicle in operation. OIE component 112 can estimate an object importance based at least in part on the object type and/or the goal associated with the vehicle. Vehicle control component 114 can control one or more components or systems of the vehicle based on the determined object importance and/or other metrics related to the object, such as a current or future object location determined or predicted by an object location determining component 122. Using the goal in additionally determining object importance can filter important objects to those more closely associated with the vehicle goal, which can result in more accurate vehicle control decisions based on the objects that have high importance corresponding to the vehicle goal.

Figure 2:
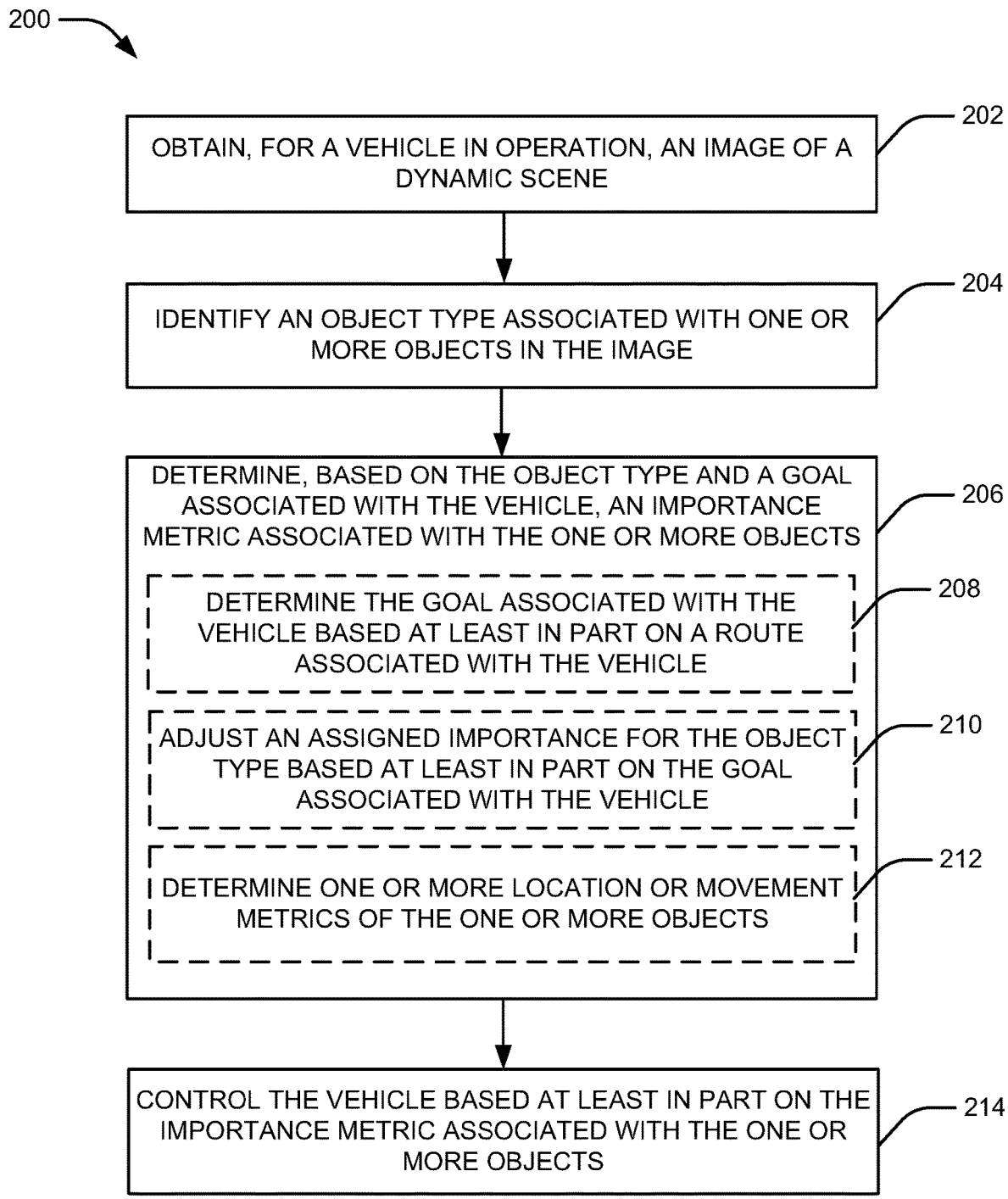
FIG. 2 illustrates a flowchart showing an example of a method for determining object importance for controlling a vehicle according to one aspect of the disclosure.

Referring now to FIG. 2, which is described in conjunction with the example system 100 of FIG. 1, an example method 200 for generating semantic segmentations of an image is illustrated. For example, method 200 can be performed by one or more processors 102 and/or memories 104 of a system 100, which can be a single computing device, distributed across multiple computing devices, etc., which can be incorporated within or otherwise associated with a vehicle for making vehicle control decisions or determinations In this regard, one or more blocks can be performed (e.g., in full or in part) on a given computing device, on a device at a remote location (e.g., such that results can be shared with the given computing device), etc.

In block 202, the method 200 can include obtaining, for a vehicle in operation, an image of a dynamic scene. In an aspect, image component 106 can obtain, for a vehicle in operation, the image of the dynamic scene. For example, image component 106 can obtain the image from a camera on the system 100 or vehicle, from memory 104, from a remotely located system, etc. The image can include multiple images (e.g., multiple images from different perspectives, multiple images for multiple instances in time such as from a video, etc.). In an aspect, the image can be obtained from a perspective of operating the vehicle in a travel direction. For example, the image can be obtained from a camera in front of the vehicle when the vehicle is moving forward, an image obtained from a camera in a rear of the vehicle when the vehicle is moving in reverse, etc. The image can include one or more objects that can be identified and used in controlling one or more systems of the vehicle, such as controlling movement of the vehicle to avoid collision with the one or more objects, controlling an alerting mechanism of the vehicle to alert of the approaching vehicle (e.g., activating a vehicle horn), etc.

In block 204, the method 200 can include identifying an object type associated with the one or more objects in the image. In an aspect, object identifying component 108 can identify one or more objects, and object type determining component 118 can identify an object type associated with the one or more objects in the image. For example, object identifying component 108 can detect visual features of the one or more objects in the image, which can be part of the visual model described in accordance with aspects herein. In one example, object identifying component 108 can detect one or more potential objects by using bounding box generating mechanisms to determine a bounding box within the image that contains a potential object. Object identifying component 108 can compare visual features of the object within the bounding box to those of objects from the object identification dataset 116 to possibly identify the one or more potential objects of a certain type (e.g., a person, vehicle, etc.), and may or may not include other objects (e.g., landscape, buildings, etc.).

In addition, for example, object identifying component 108 can identify the object based on detecting the object over multiple image frames (e.g., from images captured at a similar time instance from different perspective, from consecutive image frames in a video, etc.). Moreover, the object identification dataset 116 can include assigned importance values associated with at least some of the objects, where the assigned importance values can be determined based on modeling human gaze on the objects in actual or simulated driving scenarios. In any case, object type determining component 118 can determine an object type specified by the object identifying component 108 based on identifying the one or more object (e.g., based on an object type associated with data in the object identification dataset 116).

In block 206, the method 200 can include determining, based on the object type and a goal associated with the vehicle, an importance metric associated with the one or more objects. In an aspect, OIE component 112 can determine, based on the object type and the goal associated with the vehicle, the importance metric associated with the one or more objects. In one example, the importance metric can be the same as or similar to an assigned importance value for the object type and/or considering other properties of the identified object, such as a location, acceleration or other motion-related metrics, etc. In another example, the goal can be used to adjust the assigned importance value to generate the importance metric (e.g., as a weight applied to the assigned importance value). In yet another example, the importance metric can supplement the assigned importance value as an indicator of a level of importance (e.g., a binary value indicating important or not important, an integer value on a scale of importance, etc.).

In an aspect, OIE component 112 can determine an assigned importance value for the object using various mechanisms to identify an object type and/or the associated assigned importance value. For example, some possible works focus on driver's attention prediction supervised by human gaze information, such as those described by A. Tawari and B. Kang in "A computational framework for driver's visual attention using a fully convolutional architecture," in Intelligent Vehicles Symposium (IV), 2017 IEEE, pages 887-894. IEEE, 2017, A. Palazzi, D. Abati, S. Calderara, F. Solera, and R. Cucchiara in "Predicting the driver's focus of attention: the dr(eye)ve project," in IEEE Transactions on Pattern Analysis and Machine Intelligence, 2018, and Y. Xia, D. Zhang, A. Pozdnukhov, K. Nakayama, K. Zipser, and D. Whitney in "Training a network to attend like human drivers saves it from common but misleading loss functions," in arXiv preprint arXiv:1711.06406, 2017, which are incorporated herein by reference. In some variations, a Bayesian framework can be provided for driver's attention prediction where a fully convolutional network can be utilized with only images as input. In other examples, a multi-branch model that incorporates red, green, blue (RGB), optical flow, and semantic segmentation clips and C3D described by D. Tran, L. Bourdev, R. Fergus, L. Torresani, and M. Paluri in "Learning spatiotemporal features with 3d convolutional networks," in Proceedings of the IEEE international conference on computer vision, pages 4489-4497, 2015, which is incorporated herein by reference, can be used to extract features from multiple branches. In other variations, a driver's attention framework can be generated where a human weighted sampling strategy is used during training to handle critical situations. Still in other variations, a driver's attention can be determined and used to interpret the driving control prediction by J. Kim and J. F. Canny in "Interpretable learning for self-driving cars by visualizing causal attention," in ICCV, pages 2961-2969, 2017, which is incorporated herein by reference.

In addition, in an aspect, OIE component 112 can determine an assigned importance value for the object using region-based detection. For example, convolutional neural network (CNN) detectors, such as region-based CNN (R-CNN) detectors, can be used. In an aspect, a two-stage R-CNN framework, such as that proposed by R. Girshick, J. Donahue, T. Darrell, and J. Malik, in "Rich feature hierarchies for accurate object detection and semantic segmentation," in Computer Vision and Pattern Recognition, 2014, which is incorporated herein by reference, can be used where object proposals can be obtained and then classified to different categories. Later, Fast R-CNN, such as that proposed by R. Girshick in "Fast r-cnn," in Proceedings of the IEEE International Conference on Computer Vision, pages 1440-1448, 2015, which is incorporated herein by reference, can be used to speed up R-CNN via end-to-end training/testing. However, the Fast R-CNN relies on external object proposal algorithms. Another Faster R-CNN, such as that proposed by S. Ren, K. He, R. Girshick, and J. Sun in "Faster r-cnn: Towards realtime object detection with region proposal networks," in Advances in neural information processing systems, pages 91-99, 2015, which is incorporated herein by reference, can jointly train the proposal generation and the detection branches in a single framework. Furthermore, Faster R-CNN can be extended, such as proposed by K. He, G. Gkioxari, P. Dollar, and R. Girshick in "Mask r-cnn," in Computer Vision (ICCV), 2017 IEEE International Conference on, pages 2980-2988. IEEE, 2017, which is incorporated by reference herein, to create a unified architecture for joint detection and instance segmentation. OIE component 112, for example, can use R-CNN to assign scores to object candidates and/or to estimate object importance under the driving context rather than differentiating object categories. For example, OIE component 112 can be configured to use R-CNN, as described above, with ResNet-101 for object detection and SORT, as described by A. Bewley, Z. Ge, L. Ott, F. Ramos, and B. Uperoft, in "Simple online and realtime tracking," in Image Processing (ICIP), 2016 IEEE International Conference on, pages 3464-3468. IEEE, 2016, which is incorporated herein by reference, for tracking. In addition, OIE component 112 can track objects over a number of images, such as sequential images in a video frame (e.g., 30 frames), which may include using a tracking-by-detection framework, such as that described by M. Andriluka, S. Roth, and B. Schiele in "People-tracking-by-detection and people-detection-by-tracking," in Computer Vision and Pattern Recognition, 2008. CVPR 2008. IEEE Conference on, pages 1-8, IEEE, 2008, which is incorporated herein by reference. Some objects may not exist at the beginning or ending frames, and OIE component 112 can drop objects that are not in the ending frame.

In an example, in determining the importance metric at block 206, at block 208, the goal associated with the vehicle can be determined based at least in part on a route associated with the vehicle. In an aspect, vehicle goal determining component 120 can determine the goal associated with the vehicle based at least in part on a route associated with the vehicle. For example, vehicle goal determining component 120 can determine a predicted movement or location of the vehicle in future time instances based on the route. In an aspect, vehicle goal determining component 120 can determine the route based on a starting location and an ending location for a driving task, based on a path planned by a AD path planning module, etc. In this regard, for example, OIE component 112 can determine an importance metric of the one or more objects, for a given time instance, based on the route of the vehicle. Thus, where the one or more objects are in the travel path of the vehicle (or within a threshold distance of the travel path of the vehicle) in one or more future time instances, OIE component 112 can assign a higher importance metric to the one or more objects than if the one or more objects are not within the travel path of the vehicle. This can improve OIE for an intersection, for example, where the vehicle route indicates to turn at the intersection, by assigning importance to objects within the direction of travel of the vehicle making the turn based on the route.

In another example, in determining the importance metric at block 206, at block 210, an assigned importance for the object type can be adjusted based at least in part on the goal associated with the vehicle. In an aspect, as described, OIE component 112 can adjust the assigned importance for the object type based at least in part on the goal associated with the vehicle. In this example, OIE component 112 can obtain the assigned importance for the object type, as described, which can be based on modeling human gaze for the object type during driving simulation, predicting driver attention based on the dataset, and/or the like. In addition, in this example, OIE component 112 can adjust the assigned importance by weighting the assigned importance based on the goal, associating a binary importance or level of importance with the assigned importance, and/or the like.

In yet another example, in determining the importance metric at block 206, at block 212, one or more location or movement metrics of the one or more objects can be determined. In an aspect, as described, object location determining component 122 can determine the one or more location or movement metrics of the one or more objects. For example, object location determining component 122 can determine a current or predicted location of the one or more objects with respect to the goal of the vehicle, an acceleration or motion of the one or more objects (e.g., based on movement of the object detected over multiple time instances), a trajectory of the one or more objects (e.g., based on movement of the object detected over multiple time instances), etc., and can use one or more such metrics in additionally determining object importance. For example, object location determining component 122 can determine the predicted location of the one or more objects in one or more future time instances, and can determine object importance based at least in part on the goal of the vehicle at the one or more future time instances (e.g., a location of the vehicle along the route, etc.).

Figure 3:
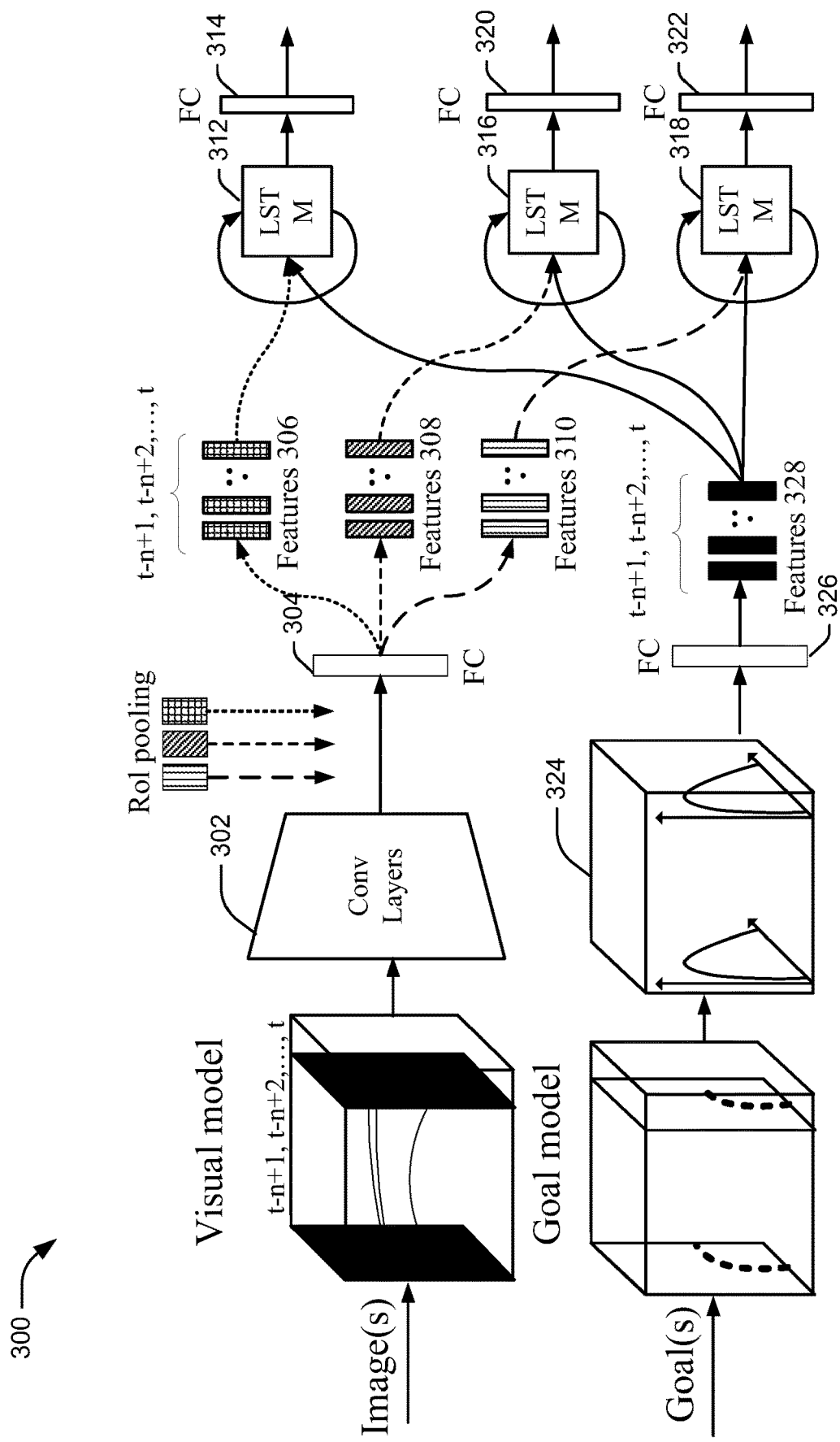
FIG. 3 illustrates an example of a process for determining object importance for controlling a vehicle according to one aspect of the disclosure.

FIG. 3 illustrates a specific example of a process 300 for determining object importance based on a visual model and a goal model. In process 300, object identifying component 108 can perform some of the functions such to identify one or more objects and OIE component 112 can perform some of the functions such to determine object importance, as described further herein. For example, long short term memory (LSTM), as proposed by S. Hochreiter and J. Schmidhuber, "Long short-term memory" in Neural computation, 9(8):1735-1780, 1997, which is incorporated by reference herein, or other suitable algorithms to determine object importance based on human gaze, driver attention prediction, etc. For example, one or more images (e.g., from a video), each having an associated time t−n+1, t−n+2, . . . , t, can be analyzed in accordance with one or more CNN layers 302 to generate one or more fully connected (FC) layers 304. One or more region of interest (RoI) can be applied at one or more steps to isolate RoIs in the image and generate corresponding features 306, 308, 310 from FC layer 304 for each of the one or more time instances. For each set of features, an algorithm such as LSTM can be applied to determine object importance based on identifying the object at each of the multiple time instances. Thus, for example, for features 306, LSTM 312 can be performed to determine the object importance for one or more objects corresponding to the set of features over the multiple time instances, and a FC layer 314 can be applied. Similarly, for sets of features 308, 310, LSTM 316, 318 can be performed and FC layers 320, 322 applied, respectively. The output for each set of features can include object importance scores, and/or the final image, and can be provided to a vehicle control system (e.g., to the AD mechanism) to assess importance of objects and accordingly make vehicle control decisions.

In addition, for example, vehicle goal determining component 120 can determine a vehicle goal to allow OIE component 112 to apply a goal model in additionally determining object importance. In this example, one or more goals of the vehicle can be provided, such as a planned route of the vehicle, which can be obtained from an AD path planning module that can be part of an AD mechanism. The goal 324 can be described at each of the one or more time instances (e.g., as points on the planned route in the real world). The goal(s) 324 for each time instance can be provided to FC layer 326 and features 328 can be generated for each of the multiple time instances. These common goal-oriented features 328 can be additionally applied or concatenated with each of the features 306, 308, 310 in associated LSTMs 312, 316, 318 with the corresponding time instances to form a final feature representation. This shared LSTM model can be used to predict object importance for each of the one or more objects given the final features.

In a specific example, the visual model used by object identifying component 108 for performing object tracking on the image/video and/or as used by OIE component 112 for determining the object importance can include steps similar to the following. For each object candidate, i, its bounding-box location, $B_i^t$, is obtained at each time step t. Each time step can correspond to each image frame in a input video. For each object candidate at each time step, high dimensional features $F_i^t$ can be extracted to represent the appearance, motion and location of the object. In this example, feature matrix $F_i^t=[f_i^{t-n+1}, f_i^{t-n+2}, \ldots, f_i^t]$ to represent each object i, in the video where n is the length of the input clip. Without goal information, an algorithm such as LSTM, or other suitable algorithms to determine object importance based on human gaze, driver attention prediction, etc., can be used directly with the $F_i^t$ as the input and the output is score $s_i^t$ of being an important object at time t.

In another example, the goal model used by the OIE component 112 in determining the object importance can include steps similar to the following. The goal-oriented feature $g^t$ at time t can be extracted based on the route of the vehicle (e.g., from an AD path planning module). The extracted feature can be concatenated with the features of each object in the image to form the final feature representation $gof_i^t=[f_i^t, g^t]$ for the object. The representation for the object within the whole video clip can be $GoF_i^t=[gof_i^{t-n+1}, gof_i^{t-n+2}, \ldots, gof_i^t]$. A one-layer LSTM model followed by a fully connected (FC) layer can perform over $GoF_i^t$ to output the importance score for each object i as shown in the equation below, for example, where W and b indicate parameters of the FC layer. Softmax layer can be used then to output the corresponding importance probability for the object.

$$s_i^t = W(\text{LSTM}(GoF_i^t)) + b$$

In another example, OIE component 112 can combine appearance, motion, and location features of an object to represent the dynamic changes of an object. Appearance feature can be extracted from one or more layers of a CNN framework, such as the fc7 layer of a regions with CNN (R-CNN) framework, described above, that can be trained using one or more datasets. For example, the one or more datasets can include those described by L. Simon, J.-P. Tarel, and R. Bremond in "Alerting the drivers about road signs with poor visual saliency," in Proc. 2009 IEEE Intelligent Vehicles Symposium, pages 48-53, 2009, G. Underwood, K. Humphrey, and E. Van Loon in "Decisions about objects in real-world scenes are influenced by visual saliency before and during their inspection," in Vision research, 51(18): 2031-2038, 2011, L. Fridman, P. Langhans, J. Lee, and B. Reimer in "Driver gaze region estimation without use of eye movement," in IEEE Intelligent Systems, 31(3):49-56, 2016, N. Pugeault and R. Bowden in "How much of driving is preattentive?" in IEEE Transactions on Vehicular Technology, 64(12):5424-5438, 2015, and S. Alletto, A. Palazzi, F. Solera, S. Calderara, and R. Cucchiara in "Dr (eye)ve: a dataset for attention-based tasks with applications to autonomous and assisted driving," in Proceedings of the IEEE Conference on Computer Vision and Pattern Recognition Workshops, pages 54-60, 2016, which are incorporated herein by reference. In another example, the R-CNN can be trained on the Pascal VOC2007, as described by M. Everingham, L. Van Gool, C. K. I. Williams, J. Winn, and A. Zisserman in "The PASCAL Visual Object Classes Challenge 2007 (VOC2007) Results," at http://www.pascalnetwork.org/challenges/VOC/voc2007/workshop/index.htm, which is incorporated herein by reference, and/or VOC2012, as described by M. Everingham, L. Van Gool, C. K. I. Williams, J. Winn, and A. Zisserman, in "The PASCAL Visual Object Classes Challenge 2012 (VOC2012) Results," at http://www.pascalnetwork.org/challenges/VOC/voc2012/workshop/index.html, which is incorporated herein by reference, trainval sets with Resnet-101, as described by K. He, X. Zhang, S. Ren, and J. Sun in "Deep residual learning for image recognition," in arXiv preprint arXiv:1512.03385, 2015, which is incorporated herein by reference, as the backbone. In any case, the appearance feature can describe both the appearance of the object and a local context around the object. Histogram of a flow of each object bounding box can be extracted as the motion feature, as described by N. Dalal, B. Triggs, and C. Schmid, in "Human detection using oriented histograms of flow and appearance," in European conference on computer vision, pages 428-441. Springer, 2006, which is incorporated herein by reference, with BIN=12. Location feature can be represented by $$\left(\frac{x_i^t}{W^t}, \frac{y_i^t}{H^t}, \frac{w_i^t}{W^t}, \frac{h_i^t}{W^t}\right)$$

where $x_i^t$, $y_i^t$, $w_i^t$, and $h_i^t$ indicate the left-top corner of $B_i^t$, its width and height. $W^t$ and $H^t$ indicate the width and height of the image t. The visual feature, $f_i^t$, is the concatenation of these three features.

Figure 4:
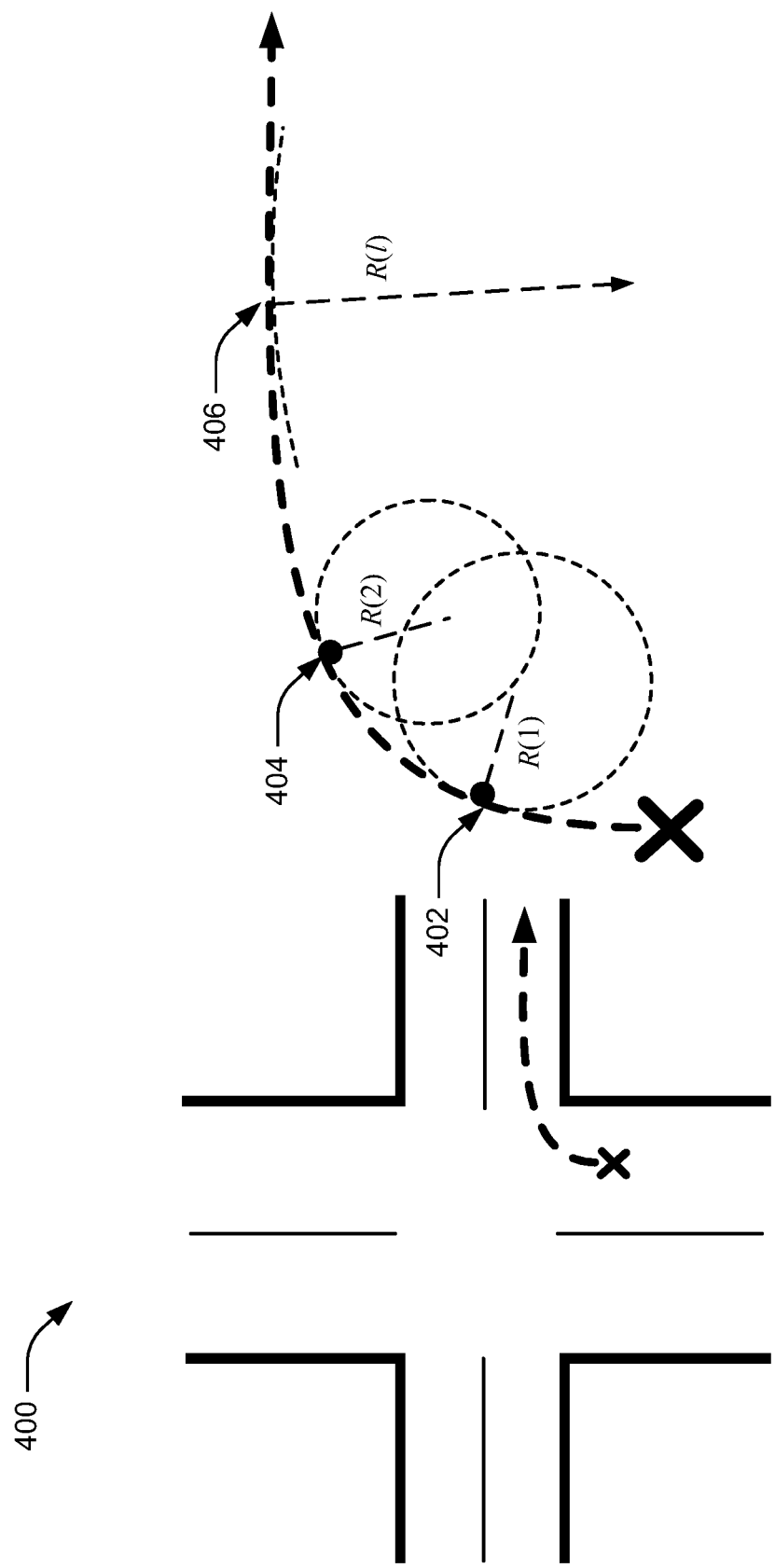
FIG. 4 illustrates an example of a planned path obtained from an autonomous driving (AD) path planning module for determining object importance according to one aspect of the disclosure.

In another example, OIE component 112 can, at each time step, obtain the planned path (with regard to distance in the vehicle-centric coordinates) based on the route (e.g., from the AD path planning module for a driving operation). FIG. 4 shows an example of a planned path obtained from an AD path planning module of an AD vehicle. As shown in FIG. 4, in a specific example, at each time step discrete points 402, 404, 406, can be sampled with respect to distance (e.g., uniformly per distance unit) to represent the planned path. Each sampled point 402, 404, 406, can be represented by (x; y) which indicates the location of the point in the vehicle-centric coordinate in the real world. Radius of curvature, R, can be directly related to the turning behavior, and can be used to represent each point on the path, which can be calculated as in the following equation given the location (x; y).

$$R = \text{sign} \times \left(\frac{(1 + y'^2)^{\frac{3}{2}}}{y''}\right)$$

where $$y' = \frac{dy}{dx} \text{ and } y'' = \frac{d^2 y}{d^2 x}.$$

sign=1 when turning right, and sign=−1 when turning left. Thus, the path of the vehicle can be represented by a discrete set of point descriptions taken from the planned path or route, as described above. For the straight road, the value of R can approach infinity, which may not be beneficial for model training/learning. In this example, $$IR = \frac{1}{R}$$

instead to describe a certain point in the planned path. At time t, for example, $IR^t=[IR(1).IR(2), \ldots, IR(L)]$ can be used to represent the planned path where IR(l) indicates the value of IR at the next l distance units and L indicates the maximum future considered. One FC layer can be applied on $IR^t$ to extract the goal-oriented feature, $g^t$.

In one specific example, for a given vehicle, IR(l) can be set as:

$$\widehat{IR}(l) = \frac{w(l)}{v(l)} = \frac{a \times yr(l)}{v(l)},$$

where w(l), v(l), and yr(l) indicate angular velocity, velocity (e.g., kilometers per hour), and yaw rate (angle per second) at the next l distance unit. One distance unit, in a specific example, can be $$\frac{1}{3.6}$$

meters, and α can be a scale number. In one specific example for determining object importance, as described above, images of a video can be provided for a video clip of length n=30. L can be set to 40, which can be roughly 10 meters in the real world. α, above, can be set to 1. For the visual model, the length of the LSTM hidden layer can be set to 256 and the FC layer in goal model can be set to 16. For image based visual model, the FC layer has 1,024 units. Weighted-cross-entropy loss is used to optimize the model and baselines. The weights for positive and negative samples can be inversely proportional to their sample numbers in one training batch.

The above features can be used to determine object importance in on-road driving videos, where the road users are considered as important objects if they have influence on the control decision of the vehicle driver (or AD mechanism). The importance of a road user can depend on both its visual dynamics, e.g. appearance, motion and location, in the driving scene and the driving goal, e.g. the planned path, of the vehicle. Using both the visual model and goal representation to conduct OIE can facilitate improved vehicle decision-making. In addition, binary brake prediction can be improved with the information of object importance.

Figure 5:
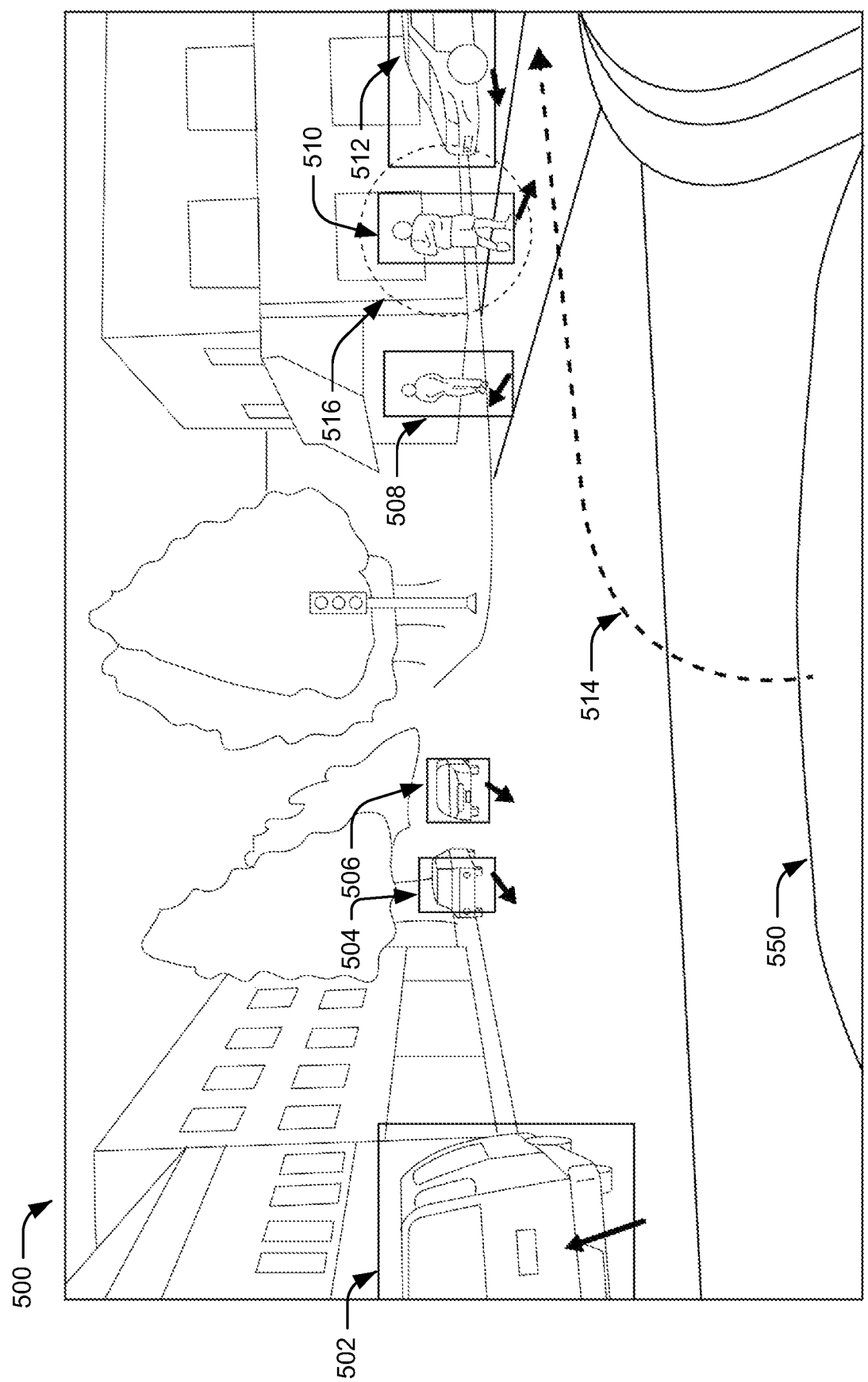
FIG. 5 illustrates an example of an image scene captured by a vehicle and determined objects and importance metrics according to one aspect of the disclosure.

FIG. 5 illustrates an example of an image 500 of a driving scene captured by a camera of an AD vehicle 550. In this example, object identifying component 108 can identify various objects 502, 504, 506, 508, 510, 512 in the image 500. As described, object identifying component 108 can use a bounding box mechanism and dataset comparison to identify the objects. OIE component 112 can determine an assigned importance value for each of the objects 502, 504, 506, 508, 510, 512, which can be based on identifying an object type associated with the objects, a location of the objects within the image 500 and/or otherwise as associated with the location of the vehicle 550, a movement or motion metrics of the objects, etc. as described. Each identified object can be identified by a bounding box, as shown in image 500, and/or by a direction (which can be determined by analyzing movement of the objects over multiple image frames) shown by corresponding arrows. In addition, OIE component 112 can determine an importance metric for the objects based on the path 514 of the vehicle 550. Based on also considering the path 514, an additional importance metric (e.g., a binary importance value represented by circle 516) can be assigned to object 510 that can be moving into the vehicle path 514, while other objects can be considered as not important as they do not interfere with the path 514. In this example, if the vehicle path 514 indicated a left turn instead of a right turn, OIE component 112 can determine object 510 as not important, and can determine other objects as important (e.g., objects 502, 504, 506, 512, which can be within the path of a left turn).

Referring back to FIG. 2, in block 214, the method 200 can include controlling the vehicle based at least in part on the importance metric associated with the one or more objects. In an aspect, vehicle control component 114 can control the vehicle based at least in part on the importance metric. For example, vehicle control component 114 can include or can be part of an AD mechanism for driving the vehicle. In this example, vehicle control component 114 can make a driving decision based on the object importance and other information regarding the object, such as location, acceleration, etc., of the object. For example, vehicle control component 114 can make a binary braking decision of whether and/or when to apply brakes when the object of importance is within the path of the vehicle. Other examples of controlling the vehicle based on detected object importance can include a decision to increase or decrease speed, activate an alerting mechanism (e.g., a horn of the vehicle), alter a steering path or steering column movement to make a wider or narrower turn than planned, modify the route or re-plan the path of the vehicle, etc.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 600 is shown in FIG. 6.

Figure 6:
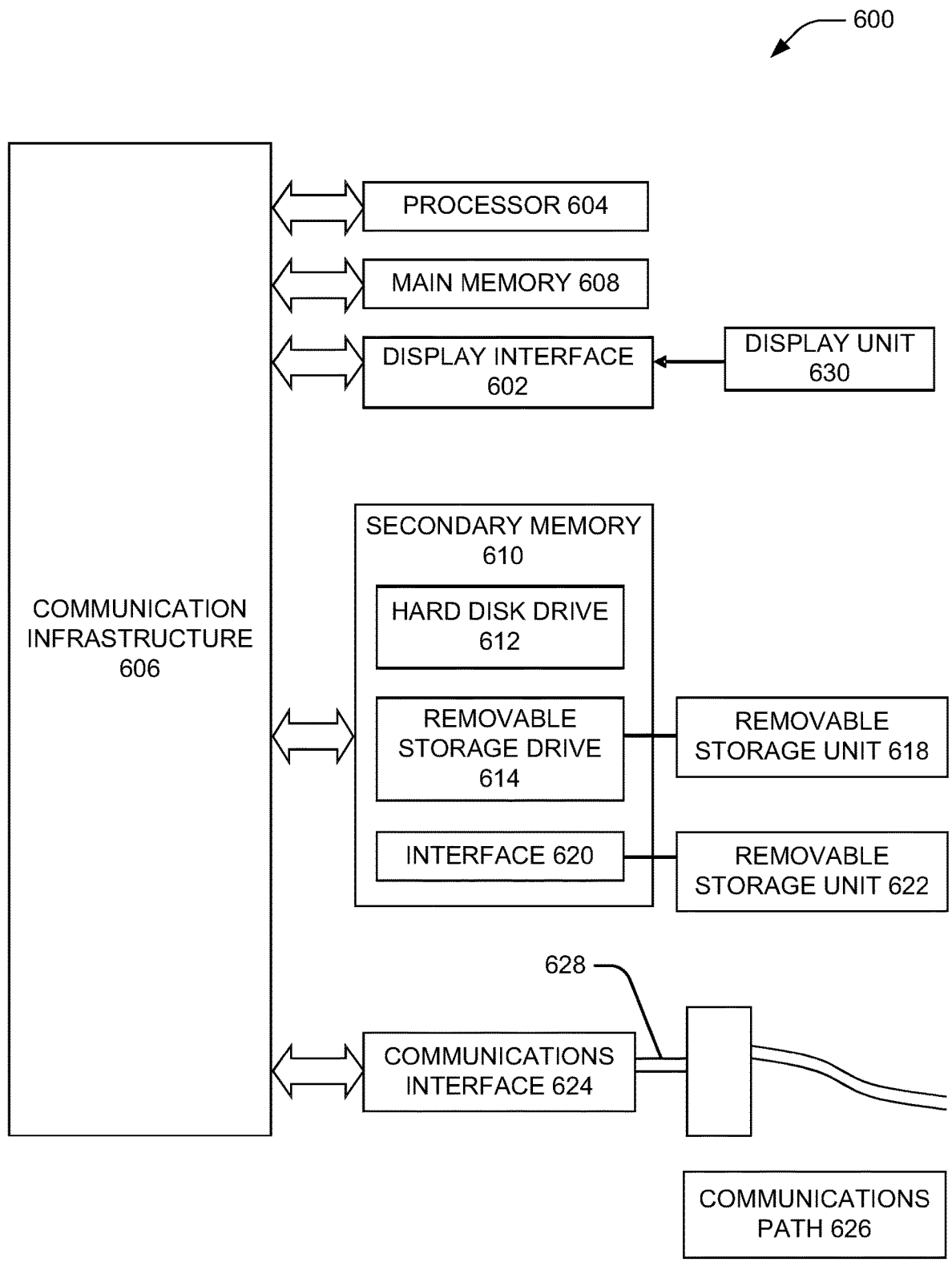
FIG. 6 presents an example system diagram of various hardware components and other features according to one aspect of the disclosure.

FIG. 6 presents an example system diagram of various hardware components and other features, for use in accordance with an aspect of the present disclosure. Computer system 600 includes one or more processors, such as processor 604. The processor 604 is connected to a communication infrastructure 606 (e.g., a communications bus, crossover bar, or network). In one example, processor 102 can include processor 604. Various software aspects are described in terms of this example computer system. After reading this description, it will become apparent to a person skilled in the relevant art(s) how to implement aspects described herein using other computer systems and/or architectures.

Computer system 600 can include a display interface 602 that forwards graphics, text, and other data from the communication infrastructure 606 (or from a frame buffer not shown) for display on a display unit 630. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600. In an example, memory 104 can include one or more of main memory 608, secondary memory 610, removable storage drive 614, removable storage unit 618, removable storage unit 622, etc.

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628, which can be electronic, electromagnetic, optical or other signals capable of being received by communications interface 624. These signals 628 are provided to communications interface 624 via a communications path (e.g., channel) 626. This path 626 carries signals 628 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects described herein can be directed to such computer program products.

Computer programs (also referred to as computer control logic) are stored in main memory 608 and/or secondary memory 610. Computer programs can also be received via communications interface 624. Such computer programs, when executed, enable the computer system 600 to perform various features in accordance with aspects described herein. In particular, the computer programs, when executed, enable the processor 604 to perform such features. Accordingly, such computer programs represent controllers of the computer system 600. Computer programs can include image component 106, object identifying component 108, OIE component 112 or its subcomponents, vehicle control component 114, etc., as described herein.

In variations where aspects described herein are implemented using software, the software can be stored in a computer program product and loaded into computer system 600 using removable storage drive 614, hard disk drive 612, or communications interface 620. The control logic (software), when executed by the processor 604, causes the processor 604 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 7:
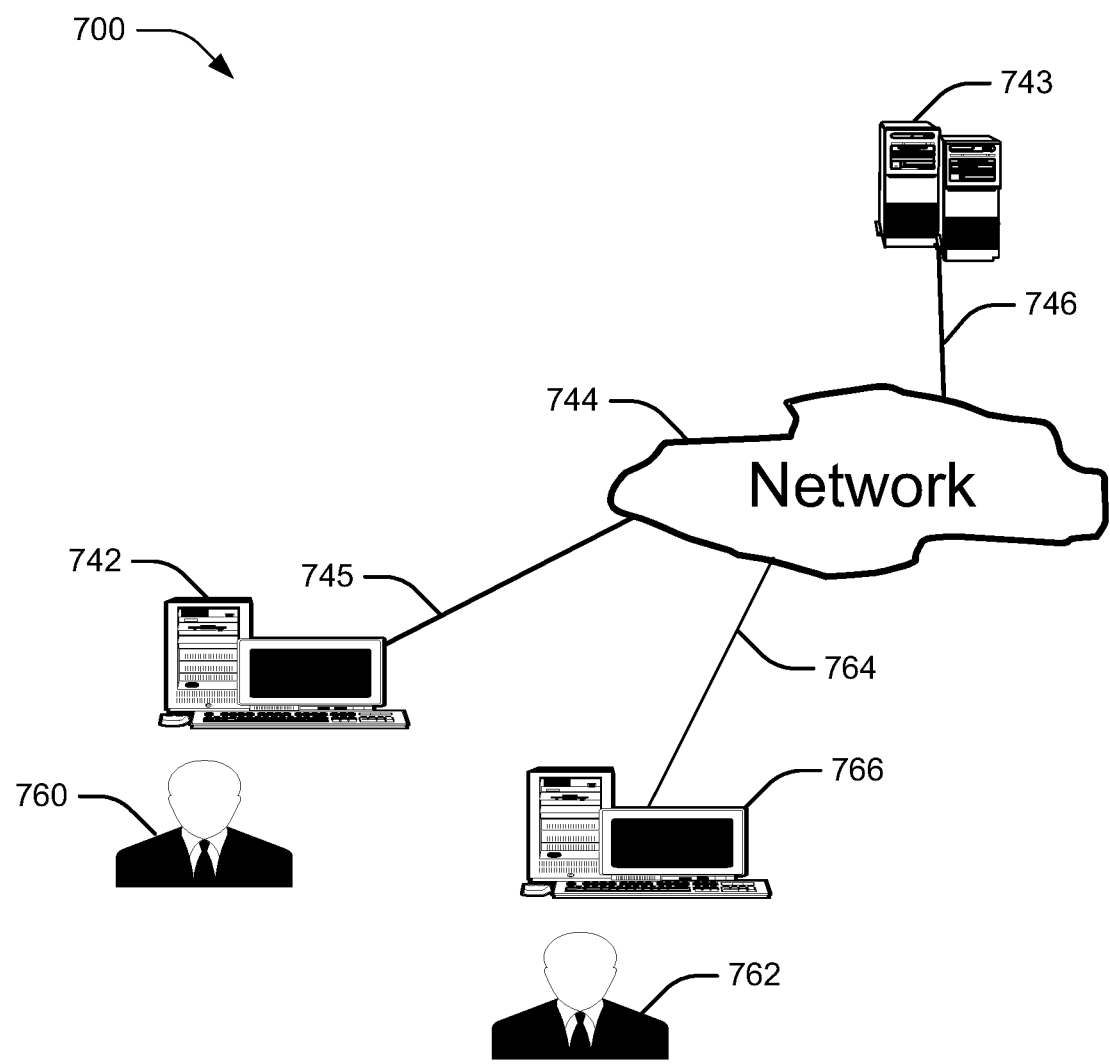
FIG. 7 is a block diagram of various example system components according to one aspect of the disclosure.

FIG. 7 is a block diagram of various example system components, in accordance with an aspect. FIG. 7 shows a communication system 700 usable in accordance with aspects described herein. The communication system 700 includes one or more accessors 760, 762 (also referred to interchangeably herein as one or more "users") and one or more terminals 742, 766. For example, terminals 742, 766 can be computing devices that may include a processor (e.g., processor 102), memory (e.g., memory 104). In one aspect, data for use in accordance with aspects described herein is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for determining object importance in vehicle control systems, comprising:
    obtaining, for a vehicle in operation, an image of a dynamic scene;
    identifying an object type associated with one or more objects in the image;
    determining an assigned importance metric for the object type;
    applying a visual model for the object type to the one or more objects, including generating a high dimensional feature matrix for the one or more objects with features representing appearance, motion, and location of the one or more objects over multiple time instances, and determining an output score for the one or more objects based on the high dimensional feature matrix and driver attention prediction for the one or more objects, wherein determining the output score for the one or more objects based on driver attention prediction includes using the image as input to a fully convolutional network that is trained using one or more datasets that are modeled on human gaze during driving simulation;
    adjusting, based on the output score for the one or more objects and based on applying a goal model for a goal associated with the vehicle, the assigned importance metric to determine an importance metric associated with the one or more objects; and
    controlling the vehicle based at least in part on the importance metric associated with the one or more objects.

2. The method of claim 1, further comprising determining the goal associated with the vehicle based at least in part on a route associated with the vehicle.

3. The method of claim 2, further comprising determining the route associated with the vehicle based at least in part on a starting location and an ending location.

4. The method of claim 2, wherein determining the importance metric associated with the one or more objects is based at least in part on whether the one or more objects are within a threshold distance of a travel path defined by the route associated with the vehicle.

5. The method of claim 1, wherein identifying the object type is based at least in part on extracting visual features of the one or more objects, and comparing the visual features to a dataset of identified objects.

6. The method of claim 1, further comprising determining an assigned importance for the object type, wherein determining the importance metric is based at least in part on adjusting the assigned importance for the object type based on the goal associated with the vehicle.

7. The method of claim 1, wherein determining the importance metric is further based at least in part on one or more of a location, an acceleration, or a trajectory of the one or more objects, as compared to the goal associated with the vehicle at one or more given time instances.

8. The method of claim 1, wherein the goal associated with the vehicle corresponds to turning the vehicle at an intersection, wherein determining the importance metric is based at least in part on determining a current or predicted location of the one or more objects with respect to turning the vehicle at the intersection.

9. A computing device for determining object importance in vehicle control systems, comprising:
    a memory; and
    at least one processor coupled to the memory, wherein the at least one processor is configured to:
        obtain, for a vehicle in operation, an image of a dynamic scene;
        identify an object type associated with one or more objects in the image;
        determine an assigned importance metric for the object type;
        apply a visual model for the object type to the one or more objects, including generating a high dimensional feature matrix for the one or more objects with features representing appearance, motion, and location of the one or more objects over multiple time instances, and determining an output score for the one or more objects based on the high dimensional feature matrix and driver attention prediction for the one or more objects, wherein determining the output score for the one or more objects based on driver attention prediction includes using the image as input to a fully convolutional network that is trained using one or more datasets that are modeled on human gaze during driving simulation;
        adjust, based on the output score for the one or more objects and based on applying a goal model for a goal associated with the vehicle, the assigned importance metric to determine an importance metric associated with the one or more objects; and
        control the vehicle based at least in part on the importance metric associated with the one or more objects.

10. The computing device of claim 9, wherein the at least one processor is further configured to determine the goal associated with the vehicle based at least in part on a route associated with the vehicle.

11. The computing device of claim 10, wherein the at least one processor is further configured to determine the route associated with the vehicle based at least in part on a starting location and an ending location.

12. The computing device of claim 10, wherein the at least one processor is configured to determine the importance metric associated with the one or more objects based at least in part on whether the one or more objects are within a threshold distance of a travel path defined by the route associated with the vehicle.

13. The computing device of claim 9, wherein the at least one processor is configured to identify the object type based at least in part on extracting visual features of the one or more objects, and comparing the visual features to a dataset of identified objects.

14. The computing device of claim 9, wherein the at least one processor is further configured to determine an assigned importance for the object type, wherein the at least one processor is configured to determine the importance metric based at least in part on adjusting the assigned importance for the object type based on the goal associated with the vehicle.

15. The computing device of claim 9, wherein the at least one processor is further configured to determine the importance metric further based at least in part on one or more of a location, an acceleration, or a trajectory of the one or more objects, as compared to the goal associated with the vehicle at one or more given time instances.

16. The computing device of claim 9, wherein the goal associated with the vehicle corresponds to turning the vehicle at an intersection, wherein the at least one processor is configured to determine the importance metric based at least in part on determining a current or predicted location of the one or more objects with respect to turning the vehicle at the intersection.

17. A non-transitory computer-readable medium storing computer executable code for determining object importance in vehicle control systems, the code comprising code for:
   obtaining, for a vehicle in operation, an image of a dynamic scene;
   identifying an object type associated with one or more objects in the image;
   determining an assigned importance metric for the object type;
   applying a visual model for the object type to the one or more objects, including generating a high dimensional feature matrix for the one or more objects with features representing appearance, motion, and location of the one or more objects over multiple time instances, and determining an output score for the one or more objects based on the high dimensional feature matrix and driver attention prediction for the one or more objects, wherein determining the output score for the one or more objects based on driver attention prediction includes using the image as input to a fully convolutional network that is trained using one or more datasets that are modeled on human gaze during driving simulation;
   adjusting, based on the output score for the one or more objects and based on applying a goal model for a goal associated with the vehicle, the assigned importance metric to determine an importance metric associated with the one or more objects; and
   controlling the vehicle based at least in part on the importance metric associated with the one or more objects.

18. The non-transitory computer-readable medium of claim 17, further comprising code for determining the goal associated with the vehicle based at least in part on a route associated with the vehicle.

19. The non-transitory computer-readable medium of claim 18, further comprising code for determining the route associated with the vehicle based at least in part on a starting location and an ending location.

20. The non-transitory computer-readable medium of claim 18, wherein the code for determining the importance metric associated with the one or more objects determines based at least in part on whether the one or more objects are within a threshold distance of a travel path defined by the route associated with the vehicle.

* * * * *